United States Patent
Gesper et al.

(10) Patent No.: US 12,552,080 B2
(45) Date of Patent: Feb. 17, 2026

(54) PLANETARY ROLLER EXTRUDER FOR PROCESSING BIODEGRADABLE MATERIALS AND METHOD FOR CLEANING THE PLANETARY ROLLER EXTRUDER

(71) Applicant: BATTENFELD-CINCINNATI GERMANY GMBH, Bad Oeynhausen (DE)

(72) Inventors: Thomas Gesper, Delbrueck (DE); Heinrich Dohmann, Bad Oeynhausen (DE); Michael Kaiser, Herford (DE)

(73) Assignee: BATTENFELD-CINCINNATI GERMANY GMBH, Bad Oeynhausen (DE)

( * ) Notice: Subject to any disclaimer, the term of this patent is extended or adjusted under 35 U.S.C. 154(b) by 78 days.

(21) Appl. No.: 18/695,818

(22) PCT Filed: Sep. 21, 2022

(86) PCT No.: PCT/EP2022/076167
§ 371 (c)(1),
(2) Date: Mar. 27, 2024

(87) PCT Pub. No.: WO2023/052211
PCT Pub. Date: Apr. 6, 2023

(65) Prior Publication Data
US 2025/0018631 A1    Jan. 16, 2025

(30) Foreign Application Priority Data
Sep. 30, 2021   (DE) ..................... 10 2021 125 395.0

(51) Int. Cl.
B29C 48/44       (2019.01)
B29C 48/00       (2019.01)
(Continued)

(52) U.S. Cl.
CPC ........ *B29C 48/2715* (2019.02); *B29C 48/022* (2019.02); *B29C 48/254* (2019.02); *B29C 48/44* (2019.02); *B29K 2995/006* (2013.01)

(58) Field of Classification Search
None
See application file for complete search history.

(56) References Cited

U.S. PATENT DOCUMENTS

| 4,773,654 A | 9/1988 | Fritsch |
| 2020/0017723 A1 | 1/2020 | Schubert et al. |

FOREIGN PATENT DOCUMENTS

| DE | 3520662 A1 | 1/1987 |
| DE | 3712749 C1 | 7/1988 |

(Continued)

*Primary Examiner* — Mohammad M Ameen
(74) *Attorney, Agent, or Firm* — LEYDIG, VOIT & MAYER, LTD.

(57) ABSTRACT

A planetary roller extruder for homogenizing, dispersing, pasteurizing, and purposefully controlling the temperature of biodegradable materials that are prone to altering their properties during processing, in particular the properties that rule out further use after the materials have been processed, such as food, medicinal products or pharmaceutical products, different regions being present in the planetary roller extruder. The planetary roller extruder includes a flow conduit having various transitions from one region to a next region in an interior and components being statically and movably installed. A seal is installed between statically installed components, by which seal gaps or cavities present are configured to be closed. A slide ring seal provides sealing between moving components, which are led from the flow conduit in the interior outward to a surrounding area, so as to avoid steps and/or notches along flow surfaces in a transition region of the moving components.

13 Claims, 6 Drawing Sheets

(51) Int. Cl.
*B29C 48/25* (2019.01)
*B29C 48/27* (2019.01)

(56) References Cited

FOREIGN PATENT DOCUMENTS

| | | | |
|---|---|---|---|
| DE | 19508125 C1 | 2/1996 | |
| DE | 10142890 A1 * | 3/2003 | ........... B29C 48/435 |
| DE | 102006063021 B3 * | 4/2018 | ............. B29B 7/826 |
| DE | 102019001191 A1 * | 8/2019 | ............. B29B 7/485 |
| DE | 102020003391 A1 | 9/2021 | |
| EP | 3594303 A1 * | 1/2020 | .............. C09J 11/08 |
| WO | WO 9731767 A2 | 9/1997 | |

* cited by examiner

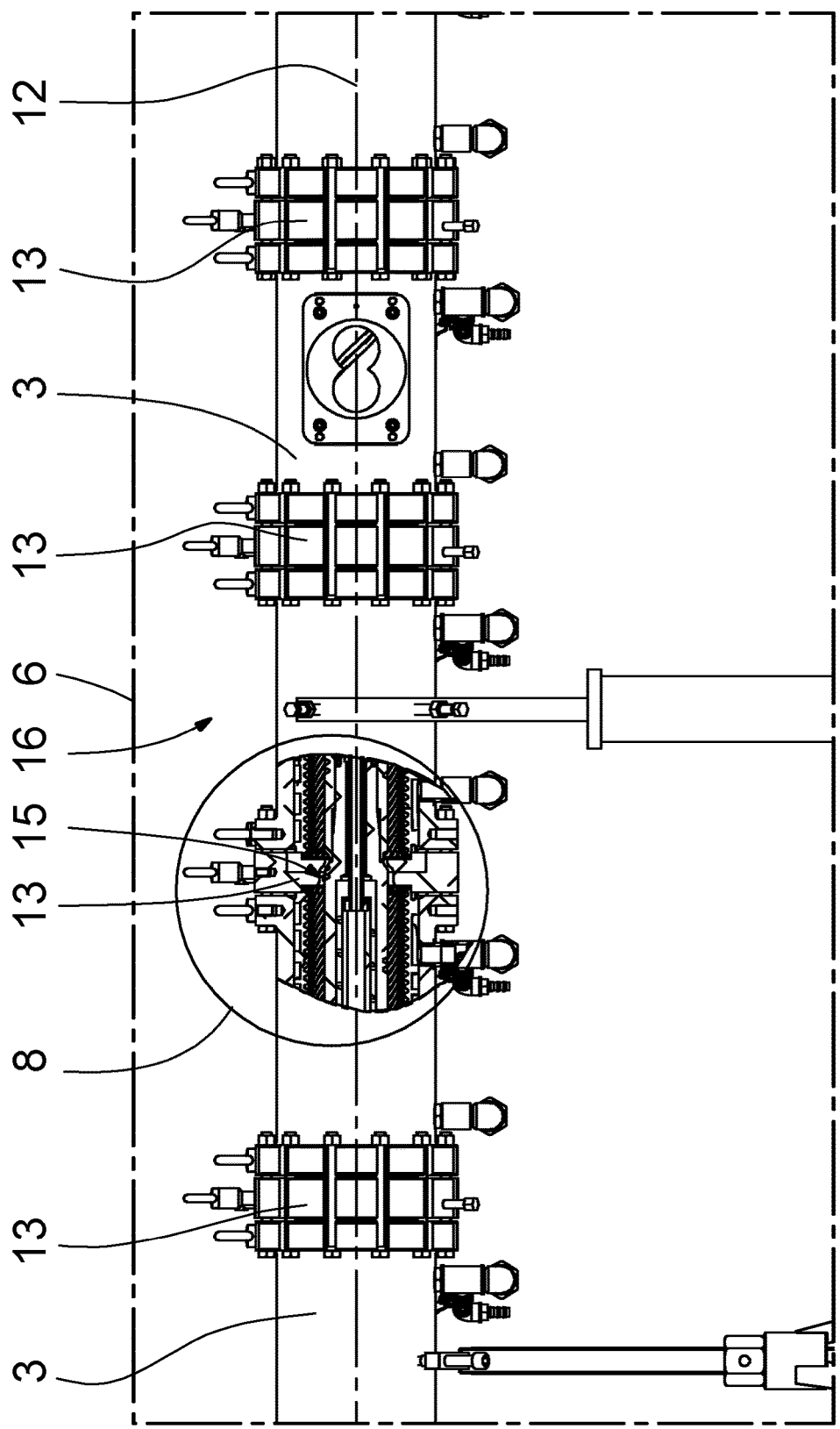

Detail Y

Detail Y

Detail X

PLANETARY ROLLER EXTRUDER FOR PROCESSING BIODEGRADABLE MATERIALS AND METHOD FOR CLEANING THE PLANETARY ROLLER EXTRUDER

CROSS REFERENCE TO RELATED APPLICATIONS

This application is a U.S. National Phase application under 35 U.S.C. § 371 of International Application No. PCT/EP2022/076167, filed on Sep. 21, 2022, and claims benefit to German Patent Application No. DE 10 2021 125 395.0, filed on Sep. 30, 2021. The International Application was published in German on Apr. 6, 2023 as WO 2023/052211 A1 under PCT Article 21 (2).

FIELD

The invention relates to a planetary roller extruder for homogenizing, dispersing, pasteurizing, and purposefully controlling the temperature of biodegradable materials that are prone to altering their properties during processing. The invention also relates to a method for cleaning the planetary roller extruder.

BACKGROUND

It is well known to use planetary roller extruders to produce a plastics melt, preferably for the granulation process or for continuous film production. In said planetary roller extruders, a plurality of planetary spindles are arranged between a planetary roller cylinder and a central or main spindle.

When the central spindle is driven, the teeth set into the roller cylinders, planetary spindles, and central spindle roll on one another such that the plastics material to be gelled is subject to an intensive kneading action. The plastics melt thus produced is of a high quality.

In addition to the calender-like rolling-out effect in the teeth, the functioning of a planetary roller extruder in terms of a process is determined substantially by the temperature control of the stationary outer casing of the planetary roller cylinder and of the rotating main spindle, since the high surface-area-to-volume ratio in this case can have a particularly effective impact on the preparation of the product.

Therefore, conventional planetary roller cylinders and central spindles are often temperature-controlled internally using a liquid. The temperature profile of the planetary spindles co-rotating between the outer casing and the main spindle cannot be influenced by external measures. In a planetary roller extruder as proposed in DE 37 12 749, the central spindle is cooled. Since the thin melt layers that come into contact with cooled components are repeatedly rearranged, effective and extremely homogeneous cooling is achieved.

The main field of application of the planetary roller extruder is in the preparation of shear- and temperature-sensitive materials, mainly PVC formulations, powder coating binder resins, and thermoplastic polyolefins (TPO). If excessively heated, PVC, for example, reacts by combusting and decomposing. The resulting so-called black spots lead to a considerable degradation in quality, particularly in the case of transparent mixtures or thin films. This problem is alleviated by setting low housing temperatures or by reducing the output by lowering the speeds, which of course results in corresponding efficiency losses.

Powder coatings have to be prepared at the lowest possible temperatures owing to the required dispersibility in pigmented formulations and the risk of crosslinking in transparent, clear formulations. In this case, local excessive heating can likewise accordingly impact on quality, or may render preparation entirely impossible. In this regard, it has been observed that with critical materials (e.g., soft PVC), degradation of the material due to decomposition occurred particularly at the downstream-facing end of the planetary roller component.

When preparing thermoplastic polyolefins, the aim is to achieve uniform melting. For system-related reasons, only a relatively slight pressure can be built up in a planetary roller extruder compared with other preparation systems; this may be advantageous for other forms of preparation.

The goal is to make use of these significant advantages of a planetary roller extruder (good homogenization, good dispersal of the material, simple option for pasteurization) in foodstuff processing. Conventional planetary roller extruders have to be adapted so that germ and bacteria contamination is kept as low as possible and the regions that come into contact with the foodstuffs can be thoroughly cleaned.

In this regard, the so-called CIP (clean-in-place) method has become established. According to Wikipedia, CIP cleaning is defined as a method for cleaning a processing system in situ.

Wikipedia describes the method and sequence as follows:
As the name suggests, in this cleaning method the system is cleaned without substantially dismantling the surfaces that have been in contact with the product. By precisely defining cleaning agents, pressures, temperatures, and times, a reproducible process is established. Clean-in-place was originally developed for the food and dairy product industry.

Conventionally, flushing methods and system sterilization by boiling are used for this purpose.
CIP sequence in the food industry:
Pre-rinse to remove coarse residue.
Clean with an alkaline agent (possibly with additives to aid the suspension of the dirt particles).
Flush cleaning agent out with water.
Wash with acid solution to remove limescale and leachate.
Flush acid out.
Disinfect to kill vegetative micro-organisms.
Flush disinfectant out, e.g., with ultrapure water.
The disinfection and acid wash stages can also be carried out in one step.

The central aim of other cleaning methods is likewise to avoid having to dismantle systems, which is laborious.

SUMMARY

In an embodiment, the present disclosure provides a planetary roller extruder for homogenizing, dispersing, pasteurizing, and purposefully controlling the temperature of biodegradable materials that are prone to altering their properties during processing, in particular the properties that rule out further use after the materials have been processed, such as food, in particular foodstuffs, or medicinal products or pharmaceutical products, different regions being present in the planetary roller extruder. The planetary roller extruder comprises a flow conduit having various transitions from one region to a next region in an interior of the planetary roller extruder and components being statically and movably installed. The planetary roller extruder comprises a seal installed between statically installed components, by which seal gaps or cavities present are configured to be closed, and a slide ring seal that provides sealing between moving components, which are led from the flow conduit in the interior of the planetary roller extruder outward to a surrounding area, so as to avoid steps and/or notches along flow surfaces in a transition region of the moving components.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 2 shows an enlarged region from FIG. 1;

DETAILED DESCRIPTION

Figure 1:
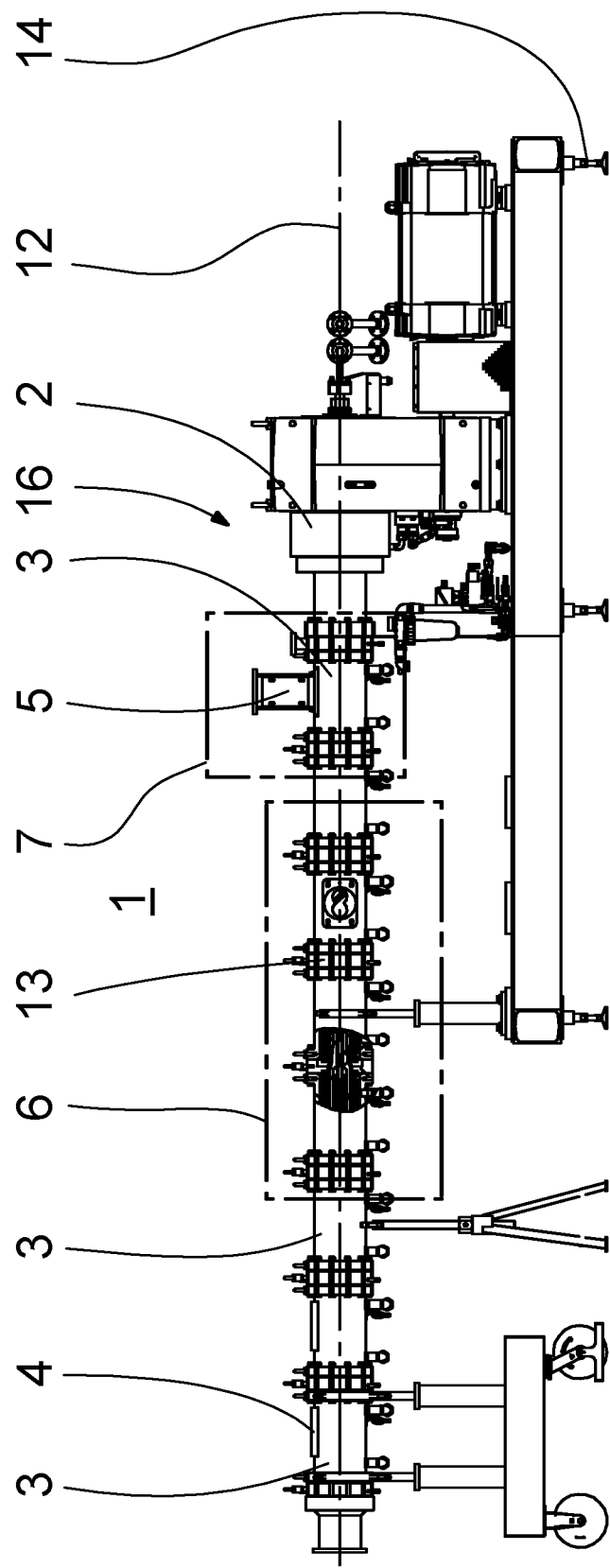
FIG. 1 shows a planetary roller extruder having a plurality of modules.

In an embodiment, a planetary roller extruder is provided for homogenizing, dispersing, pasteurizing, and purposefully controlling the temperature of biodegradable materials that are prone to altering their properties during processing in particular the properties that rule out further use after said materials have been processed, such as food, in particular foodstuffs, or medicinal products or pharmaceutical products, different regions being present in the planetary roller extruder, there being a flow conduit having various transitions from one region to the next region in the interior of the planetary roller extruder, components being statically and movably installed.

In an embodiment, the present invention provides a planetary roller extruder that can be used for a simple cleaning process and such that no time-consuming dismantling thus needs to be carried out in order to clean the planetary roller extruder. Furthermore, an embodiment of the invention provides a method for carrying out cleaning processes with little or no dismantling of the system components of a planetary roller extruder.

An embodiment is characterized in that a seal is installed between statically installed components, by means of which seal gaps or cavities present can be closed, and a slide ring seal provides sealing between moving components, which are led from the flow conduit in the interior of the planetary roller extruder outward to the surrounding area, such as to avoid steps and/or notches along the flow surfaces in the transition region of the moving components. This thus ensures that material does not dwell inside the flow conduit, thereby keeping potential germ formation as low as possible.

Elastomer seals, ceramic seals, or metal seals can be used as seals; in this respect, it is important that the seal is deformed such that gaps present with respect to the flow conduit, etc., are closed.

According to an embodiment, it is provided that the transitions in the flow conduit are configured in terms of flow such that abrupt cross-sectional changes are avoided.

Alternatively, at least the regions through which the biodegradable material flows are optimized in terms of flow such that a cleaning medium that flows through permeates all flow spaces. This configuration ensures that, as far as possible, the material flowing through cannot become stuck in the flow conduit. Even just small undercuts, chambers, or conduits provide space in which the materials can dwell in the flow conduit for a relatively long time, thereby allowing germs to form. The configuration of the conduit in terms of flow need not necessarily have a continuous profile in all regions since a turbulent flow can be advantageous in a cleaning process in which a cleaning medium passes through the flow conduit.

To improve a cleaning process of this kind, it is provided that individual regions be equipped with additional inflow and outflow conduits, as a result of which flow portions can be closed by means of additional components. If protrusions in the flow conduit are unavoidable, for example in regions such as the feed chute, the flow conduit can be closed easily such that a flow surface that is optimized in terms of flow is produced in the roller component. In addition, other regions can in turn be opened if the inflow or outflow of, for example, a cleaning medium in that region is expedient.

A method according to an embodiment for cleaning a flow conduit, through which biodegradable material flows, in a planetary roller extruder is characterized in that the flow conduit is flushed using a cleaning medium, all the flow spaces in the flow conduit being permeated by the cleaning medium, or flow surfaces in the flow conduit being heated such that remnants of the biodegradable material combust. The planetary roller extruder is thus configured such that the flow conduit can be cleaned without any dismantling. Any small accumulations of the processed material, as a result of which germs can form, are washed away by means of the cleaning medium or are combusted in a similar way to pyrolysis. Caustic solutions having particular pH values are used as the cleaning medium. It is also provided that a gaseous medium, such as water vapor or other media that are in a gaseous state of matter at a temperature that kills germs, flows through the system. In that case, it may not be strictly necessary (depending on the medium) to work with a particular temperature of the medium. Caustic solutions, peroxide, disinfectants, etc. are generally not heated; for this reason, a cleaning cycle made up of a plurality of cleaning agents can also be provided, for example pre-cleaning using chemical media, flushing using water, followed by a germ-killing cycle using hot water or water vapor.

For this purpose, it is provided according to an embodiment that the cleaning medium is conveyed through the flow conduit at a predetermined temperature and/or a predetermined flow rate. Depending on the processed material, the cleaning medium has to be conveyed through the flow conduit at different temperatures in order to kill germs and/or detach remaining material particles. The flow rate can also play a role as regards whether particles are entrained and thus flushed out, which is why the flow rate can be varied.

The method can be optimized by varying the intervals at which media flow through the flow conduit and/or by cleaning individual portions of the flow conduit differently. In addition, the planetary roller extruder can be started up, thereby assisting with the dispersal of the cleaning medium. Different operating speeds of the planetary roller extruder during the cleaning can likewise have a positive impact on the cleaning process. The method can thus be adapted to the particular demands of the cleaning process. Various parameters, such as the number of flow cycles, the speed of the cleaning medium, its temperature, etc., can be varied. If a laminar or turbulent course of the cleaning medium as it flows through the system is more expedient, this can likewise be achieved by selecting suitable parameter settings. Open-loop or closed-loop control of the process by adjusting the parameters can also be carried out in a fully and/or semi-automatic way by means of the machine controller.

Tilting the system out of its horizontal position or moving it back and forth, thereby additionally moving the cleaning medium in the flow conduit, assists the cleaning process.

Further assistance, or even different assistance, for cleaning the flow conduit in the planetary roller extruder is provided. For example, the flow conduit can be configured such that the flow surfaces are heated so that all the remnants combust, in a similar way to pyrolysis in ovens. Germs are killed, and only the remaining ash or soot particles need removing; this is ensured by means of a simple flushing operation. Microwave irradiation and/or shaking in the presence of high-frequency radiation can also be provided.

Figure 4:
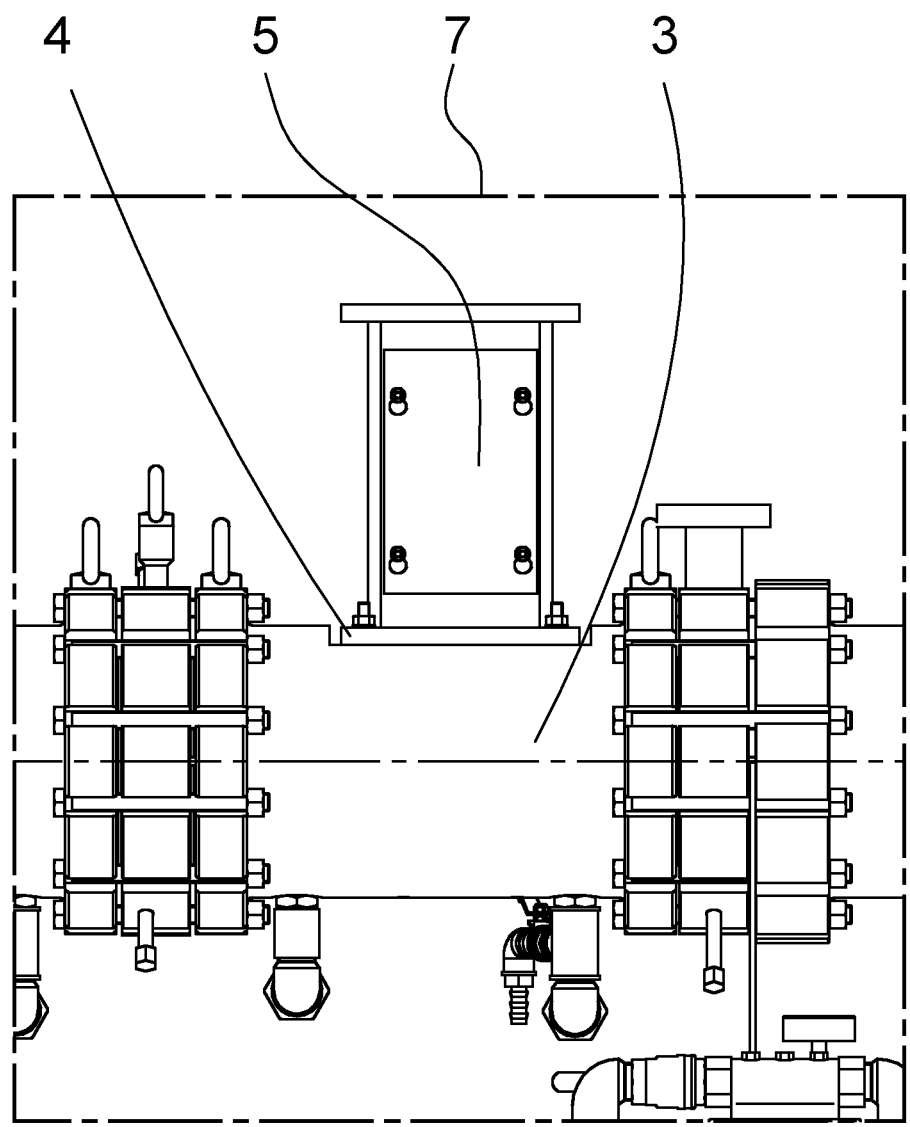
FIG. 4 shows a further enlarged region according to FIG. 1.

FIG. 1 shows a planetary roller extruder 1 in which a plurality of roller components 3 are arranged along the extrusion axis 12, thus forming zones that are passed through one after the other during the process. The number of zones is determined by the particular application, for example the extent to which thermal or mechanical homogenization is required, or the number of different steps due to heating and cooling, or the gradual admixing of further substances. For this purpose, some roller components 3 have openings 4, which are closed by a lid but can, if required, be equipped with additional components. One of the openings 4 is equipped with a feed chute 5, via which materials or additives are fed in. The joint central spindle is driven by means of the drive 2. The area surrounding the planetary roller extruder 1 is denoted by the reference numeral 16. The entire system is on a platform, which in turn has height-adjustable system feet 14. By means of these system feet 14, for example, a cleaning process can be assisted by tilting the system to a particular angle or swiveling it back and forth in a similar way to a shaking process. Here, the enlargements reproduced in FIGS. 2 and 4 are denoted by reference numerals 6 and 7.

Figure 3A:
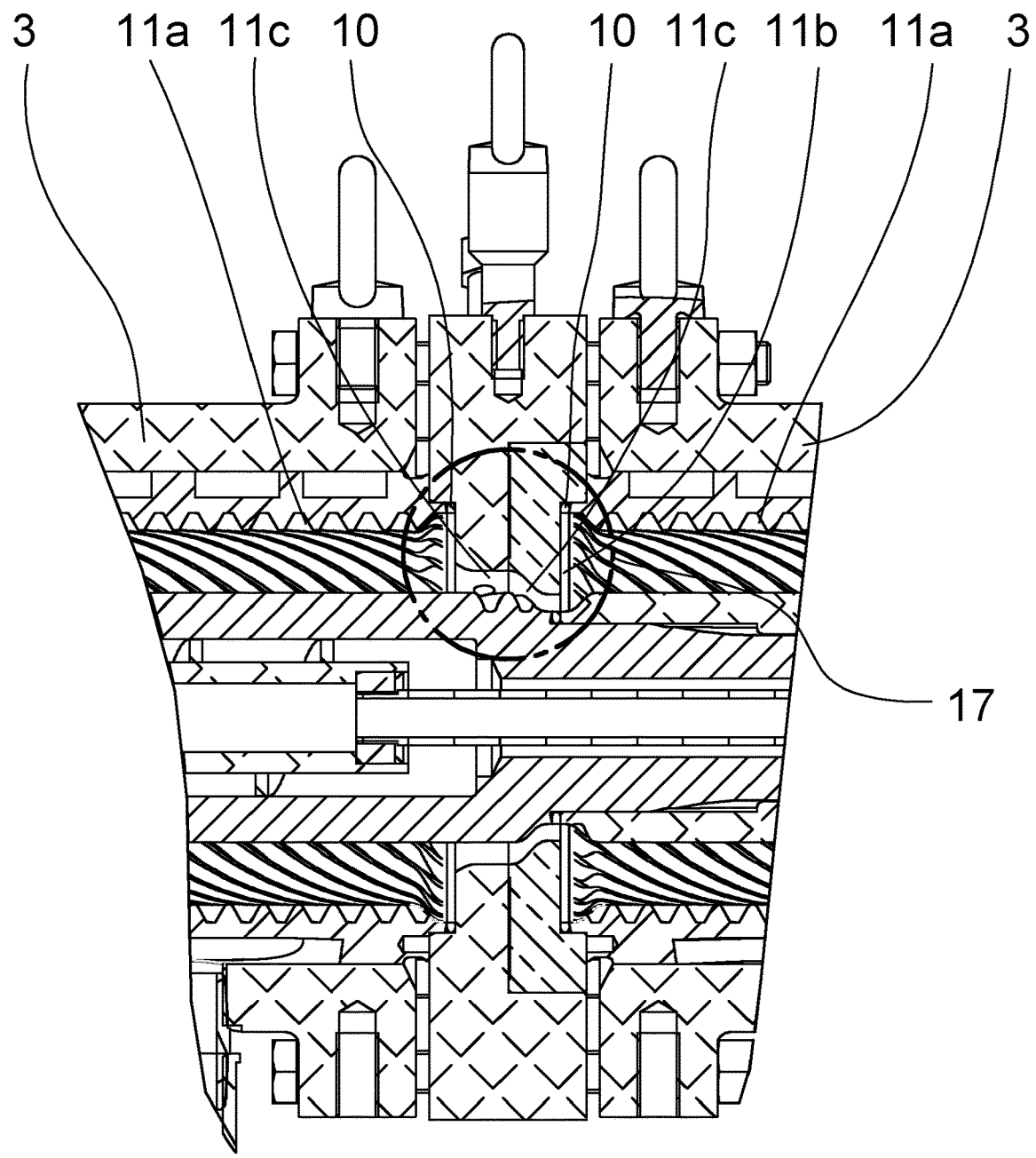
FIGS. 3a-3c show details from FIG. 2.
Figure 3B:
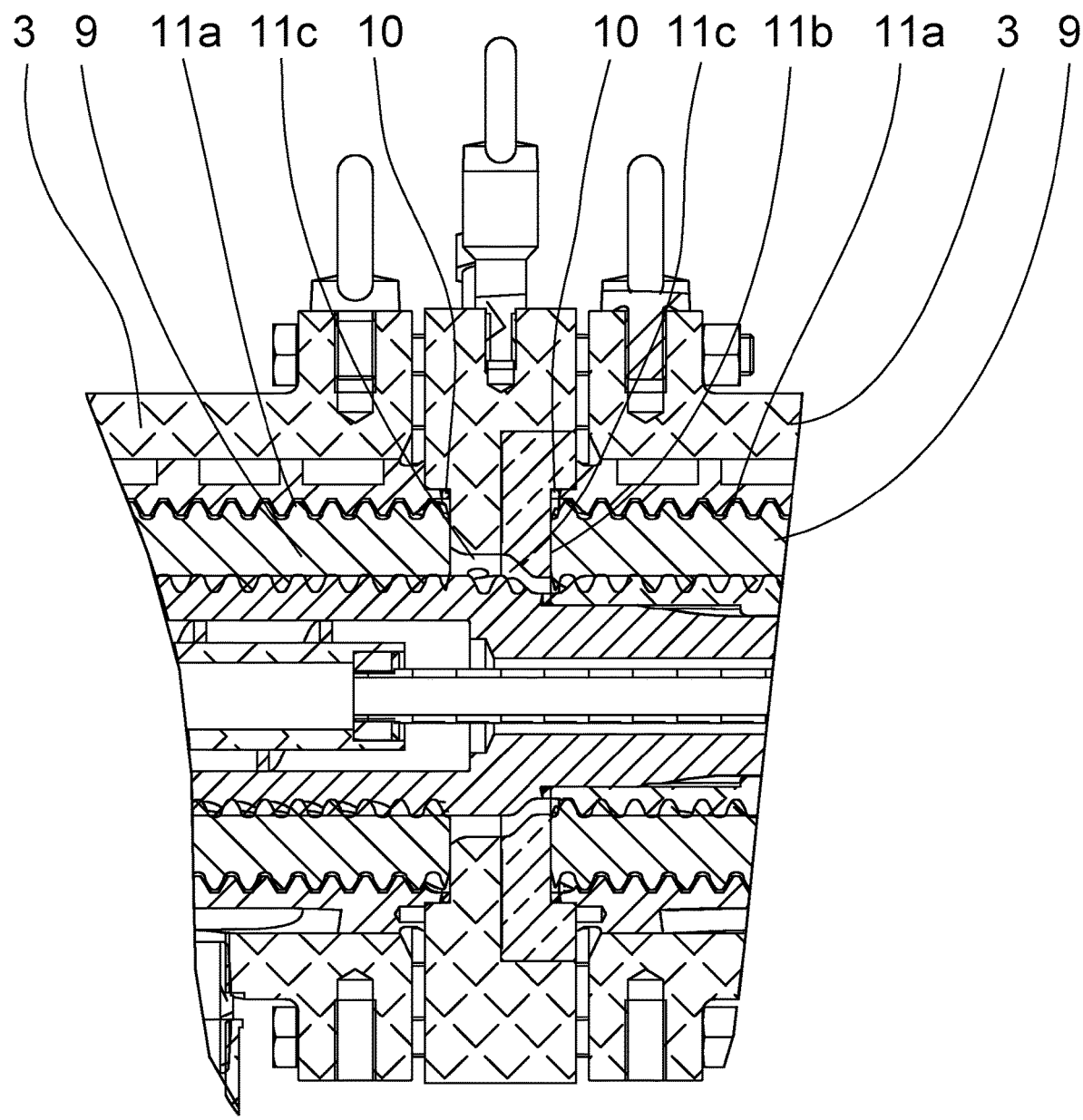
Figure 3C:
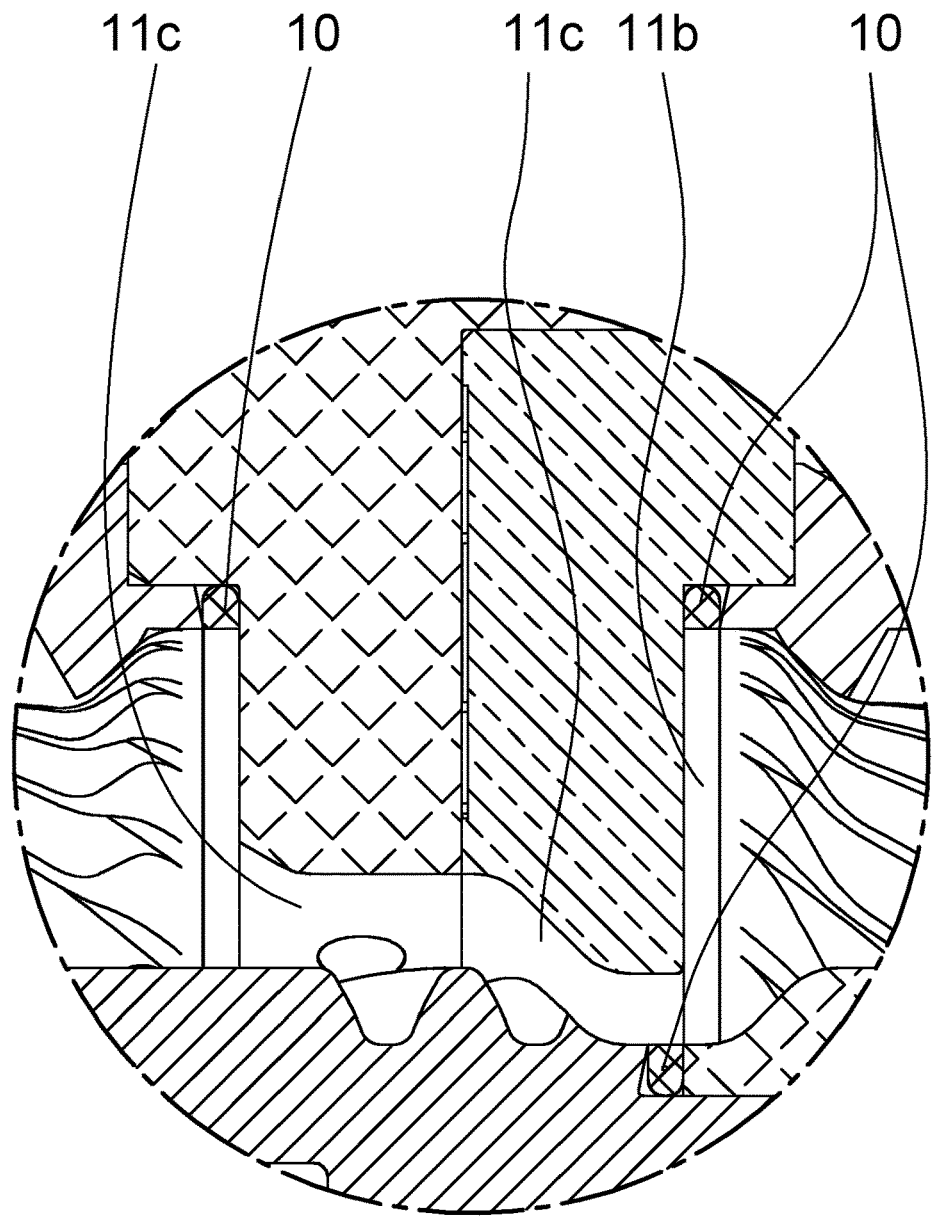

FIG. 2 shows the enlargement X having reference numeral 6 according to FIG. 1, together with a detail Y as reference numeral 8, which is reproduced in FIG. 3. The enlargement 6 clearly shows that roller components 3 are arranged one behind the other and are interconnected by means of baffle rings 13. The interior of the planetary roller extruder 1 is denoted by reference numeral 15, and the surrounding area is denoted by reference numeral 16, as in FIG. 1.

FIG. 3 shows the detail according to reference numeral 8 in FIG. 2. FIGS. 3a and 3b differ merely in that FIG. 3a is configured without the planetary spindle 9 and FIG. 3b is configured with it. A flow conduit extends in the extrusion direction and continues around the planetary spindle 9 by a first sub-conduit 11a, via a region 11b, which in particular includes the contact surface on the baffle ring 13, and via a transition region 11c to the next roller component 3.

A longitudinal bore (parallel to the extrusion axis 12 and perpendicular to the contact surface) through the baffle ring 13 can create an additional connection between two adjacent roller components 3 and can thus form a further region of the flow conduit 11. Depending on the size of this connection, this again has an impact on the change in the cross section in the flow conduit and can influence it accordingly.

In terms of flow, this flow conduit 11 is configured such that it can be cleaned by means of a cleaning process, for example the above-described CIP processes, without dismantling the components. Consequently, the flow surfaces of the flow conduit in particular do not have any steps or notches at or between the flow surfaces. Abrupt cross-sectional changes are avoided but are not entirely ruled out; they can even be desirable in some cases for changing the flow behavior, e.g., to achieve a turbulent flow. The transition should, however, be largely homogeneous, i.e., without steps and edges that could again be prone to dirt accumulations. The seals 10 between the static components are also configured accordingly for this purpose and eliminate such steps and/or edges owing to their elasticity.

FIG. 4 reproduces the enlargement Z according to reference numeral 7. Here, one of the roller components 3 having an opening 4 is shown. A feed chute 5 having a lid is placed on said opening 4, and material can be fed in via said feed chute.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

1 Planetary roller extruder
2 Drive
3 Roller component
4 Openings in 3
5 Feed chute
6 Enlargement X
7 Enlargement Z
8 Detail Y
9 Planetary spindle
10 Seal
11 Flow conduit
12 Extrusion axis
13 Baffle ring
14 System foot
15 Inner region of 1
16 Surrounding area

The invention claimed is:

1. A planetary roller extruder for homogenizing, dispersing, pasteurizing, and purposefully controlling the temperature of biodegradable materials that are prone to altering their properties during processing, including the properties that rule out further use after the materials have been processed, including foodstuffs, or medicinal products or pharmaceutical products, different regions being present in the planetary roller extruder, the planetary roller extruder comprising:

a flow conduit having various transitions from one region to a next region in an interior of the planetary roller extruder;

components being statically and movably installed;

a seal installed between statically installed components, by which seal gaps or cavities present are configured to be closed; and a slide ring seal that provides sealing between moving components, which are led from the flow conduit in the interior of the planetary roller extruder outward to a surrounding area, so as to avoid steps and/or notches along flow surfaces in a transition region of the moving components.

2. The planetary roller extruder according to claim 1, wherein the transitions in the flow conduit are configured in terms of flow such that abrupt cross-sectional changes are avoided.

3. The planetary roller extruder according to claim 2, wherein at least the regions through which the biodegradable material flows are optimized in terms of flow such that a cleaning medium that flows through permeates all flow spaces.

4. The planetary roller extruder according to claim 3, wherein regions are equipped with additional inlet and outlet conduits.

5. The planetary roller extruder according to claim 3, wherein flow portions can be closed by additional components.

6. A method for cleaning a flow conduit, through which biodegradable material flows, in the planetary roller extruder according to claim 1, the method comprising:

flushing the flow conduit using a cleaning medium; and permeating all flow spaces in the flow conduit with the cleaning medium, or heating flow surfaces in the flow conduit such that remnants of biodegradable material combust.

7. The method according to claim 6, wherein the cleaning medium is conveyed through the flow conduit at a predetermined temperature and/or a predetermined flow rate.

8. The method according to claim 6, wherein intervals at which media flow through the flow conduit are varied.

9. The method according to claim 6, wherein the flow conduit comprises portions that are cleaned differently.

10. The method according to claim 6, wherein an operating speed of the planetary roller extruder is different during the cleaning.

11. The method according to claim 6, wherein horizontal positions of the planetary roller extruder are changed.

12. The method according to claim 9, wherein the cleaning medium is conveyed through the flow conduit at a predetermined temperature and/or a predetermined flow rate.

13. The method according to claim 9, wherein intervals at which media flow through the flow conduit are varied.

* * * * *